United States Patent
Lieder et al.

(10) Patent No.: US 10,600,032 B2
(45) Date of Patent: *Mar. 24, 2020

(54) PRIORITIZATION OF E-MAIL FILES FOR MIGRATION

(71) Applicant: International Business Machines Corporation, Armonk, NY (US)

(72) Inventors: Stacy L. Lieder, Del Valle, TX (US); Hilda A. Saucedo, Kyle, TX (US); Charles E. Smith, Liberty Hill, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/953,499

(22) Filed: Apr. 16, 2018

(65) Prior Publication Data

US 2018/0232699 A1      Aug. 16, 2018

Related U.S. Application Data

(63) Continuation of application No. 14/743,120, filed on Jun. 18, 2015, now Pat. No. 9,971,995.

(51) Int. Cl.
*G06Q 10/10* (2012.01)

(52) U.S. Cl.
CPC ................. *G06Q 10/107* (2013.01)

(58) Field of Classification Search
CPC ............. G06Q 30/0251; G06Q 10/107; G06F 16/248; G06F 16/10; G06F 3/0608; G06F 16/93; G11B 27/034
See application file for complete search history.

(56) References Cited

U.S. PATENT DOCUMENTS

| | | |
|---|---|---|
| 5,845,128 A | 12/1998 | Noble et al. |
| 6,898,589 B2 | 5/2005 | Erdmenger et al. |
| 7,340,491 B2 | 3/2008 | Campbell |
| 7,752,239 B2 | 7/2010 | Richards et al. |

(Continued)

OTHER PUBLICATIONS

Zheng, J. et al., "Workload-aware Live Storage Migration for Clouds," ACM SIGPLAN Notices, vol. 46, No. 7, pp. 133-144, ACM, 2011.

(Continued)

*Primary Examiner* — Etienne P Leroux

(74) *Attorney, Agent, or Firm* — Cuenot, Forsythe & Kim, LLC

(57) ABSTRACT

For each of a plurality of e-mail files contained in a first data repository, at least one score for the e-mail file can be determined. Determining the at least one score can include determining whether the e-mail file contains at least one design element and, responsive to determining that the e-mail file contains at least one design element, determining whether the design element is authored by a template developer. A ranking can be assigned to each of the plurality of e-mail files based on the scores. E-mail files having a ranking that at least meets a threshold value can be identified. Migration of the e-mail files having the ranking that at least meets the threshold value to the second data repository can be automatically initiated in response to the user selecting a user interface element.

20 Claims, 4 Drawing Sheets

(56) References Cited

U.S. PATENT DOCUMENTS

| | | |
|---|---|---|
| 8,055,862 B2 | 11/2011 | Bender et al. |
| 8,572,033 B2 | 10/2013 | Shukla |
| 8,799,245 B2 | 8/2014 | Amarendran et al. |
| 8,812,448 B1 | 8/2014 | Anderson et al. |
| 2006/0136525 A1* | 6/2006 | Akelbein ............... G06F 3/0608 |
| 2008/0065736 A1* | 3/2008 | Gross .................... G06Q 10/107 709/207 |
| 2010/0161735 A1 | 6/2010 | Sharma |
| 2010/0251362 A1* | 9/2010 | Gillum ................. G06Q 10/107 726/22 |
| 2011/0047192 A1* | 2/2011 | Utsunomiya ........... G06F 16/10 707/809 |
| 2012/0054264 A1 | 3/2012 | Haugh et al. |
| 2012/0096134 A1 | 4/2012 | Suit |
| 2013/0124690 A1* | 5/2013 | Liebman .............. G11B 27/034 709/219 |
| 2013/0212200 A1 | 8/2013 | Dennis et al. |
| 2014/0046945 A1* | 2/2014 | Deolalikar .............. G06F 16/93 707/737 |
| 2014/0181220 A1 | 6/2014 | Griffin |
| 2014/0344247 A1* | 11/2014 | Procopio ............... G06F 16/248 707/722 |
| 2015/0073895 A1* | 3/2015 | Karnin ............... G06Q 30/0251 705/14.49 |
| 2016/0371285 A1 | 12/2016 | Lieder et al. |

OTHER PUBLICATIONS

U.S. Appl. No. 14/743,120, Non-Final Office Action, dated Jul. 6, 2017, 13 pg.

U.S. Appl. No. 14/743,120, Notice of Allowance, dated Jan. 3, 2018, 14 pg.

* cited by examiner

| E-mail File john.doe@ibm.com | |
|---|---|
| Parameter | Score |
| E-mail file template used? | 10 |
| Number of design elements | 7 |
| Design Element 1 type | 5 |
| Design Element 1 – template used? | 2 |
| Design Element 2 | 8 |
| Design Element 2 – template used? | 5 |
| Design Element 3 | 2 |
| Design Element 3 – template used? | 5 |

. . .

| Total | 44 |
|---|---|
| Ranking | 4 |

| E-mail File | Ranking |
|---|---|
| E-mail File jane.doe@ibm.com | 0 |
| E-mail File fred.doe@ibm.com | 0 |
| E-mail File jim.doe@ibm.com | 1 |
| E-mail File frank.doe@ibm.com | 2 |
| E-mail File james.doe@ibm.com | 3 |
| E-mail File dev.group@ibm.com | 4 |
| E-mail File john.doe@ibm.com | 4 |
| E-mail File tim.doe@ibm.com | 5 |

For each of a plurality of e-mail files contained in a first data repository, determine at least one score for the e-mail file, determining the at least one score including determining whether the e-mail file contains at least one design element and, responsive to determining that the e-mail file contains at least one design element, determining whether the design element is authored by a template developer
505

↓

Based on scores assigned to the plurality of e-mail files, automatically assign, using a processor, a ranking to each of the plurality of e-mail files, the ranking assigned to each e-mail file indicating a priority of the e-mail file as a candidate for migration to a second data repository
510

↓

Output a listing comprising each of the e-mail files and the ranking assigned to each of e-mail files
515

FIG. 5

PRIORITIZATION OF E-MAIL FILES FOR MIGRATION

BACKGROUND

The present invention relates to electronic mail (e-mail) systems, and more specifically, to e-mail file migration.

The use of e-mail is commonplace throughout much of the world. Users interact with e-mail systems, usually via an e-mail client (either local or web-based) to generate, send, receive and view e-mails. There are a myriad of e-mail systems currently available, and sometimes an organization chooses to change e-mail systems. Rather than maintaining the old e-mail system to keep e-mails stored by that system, oftentimes it is preferred to migrate such e-mails to the new e-mail system.

SUMMARY

A method includes, for each of a plurality of e-mail files contained in a first data repository, determining at least one score for the e-mail file. Determining the at least one score can include determining whether the e-mail file contains at least one design element and, responsive to determining that the e-mail file contains at least one design element, determining whether the design element is authored by a template developer. The method also can include, based on scores assigned to the plurality of e-mail files, automatically assigning, using a processor, a ranking to each of the plurality of e-mail files, the ranking assigned to each e-mail file indicating a priority of the e-mail file as a candidate for migration to a second data repository. The method also can include, based on the ranking assigned to each of the plurality of e-mail files, automatically identifying e-mail files having a ranking that at least meets a threshold value and, responsive to automatically identifying e-mail files having the ranking that at least meets the threshold value, presenting to a user a selectable user interface element. The method also can include, responsive to the user selecting the user interface element, automatically initiating migration of the e-mail files having the ranking that at least meets the threshold value to the second data repository.

A system includes a processor programmed to initiate executable operations. The executable operations include, for each of a plurality of e-mail files contained in a first data repository, determining at least one score for the e-mail file. Determining the at least one score can include determining whether the e-mail file contains at least one design element and, responsive to determining that the e-mail file contains at least one design element, determining whether the design element is authored by a template developer. The executable operations also can include, based on scores assigned to the plurality of e-mail files, automatically assigning a ranking to each of the plurality of e-mail files, the ranking assigned to each e-mail file indicating a priority of the e-mail file as a candidate for migration to a second data repository. The executable operations also can include, based on the ranking assigned to each of the plurality of e-mail files, automatically identifying e-mail files having a ranking that at least meets a threshold value and, responsive to automatically identifying e-mail files having the ranking that at least meets the threshold value, presenting to a user a selectable user interface element. The executable operations also can include, responsive to the user selecting the user interface element, automatically initiating migration of the e-mail files having the ranking that at least meets the threshold value to the second data repository.

A computer program includes a computer readable storage medium having program code stored thereon. The program code is executable by a processor to perform a method. The method includes, for each of a plurality of e-mail files contained in a first data repository, determining, by the processor, at least one score for the e-mail file. Determining the at least one score can include determining whether the e-mail file contains at least one design element and, responsive to determining that the e-mail file contains at least one design element, determining whether the design element is authored by a template developer. The method also can include, based on scores assigned to the plurality of e-mail files, automatically assigning, by the processor, a ranking to each of the plurality of e-mail files, the ranking assigned to each e-mail file indicating a priority of the e-mail file as a candidate for migration to a second data repository. The method also can include, based on the ranking assigned to each of the plurality of e-mail files, automatically identifying, by the processor, e-mail files having a ranking that at least meets a threshold value and, responsive to automatically identifying e-mail files having the ranking that at least meets the threshold value, presenting to a user a selectable user interface element. The method also can include, responsive to the user selecting the user interface element, automatically initiating, by the processor, migration of the e-mail files having the ranking that at least meets the threshold value to the second data repository.

BRIEF DESCRIPTION OF THE DRAWINGS

FIG. 3 depicts an example of scores and a ranking assigned to an e-mail file.

FIG. 4 depicts an example of a list of e-mail files and rankings assigned to the e-mail files.

FIG. 5 is a flow chart illustrating an example of a method of ranking e-mail files as candidates for migration.

DETAILED DESCRIPTION

Figure 1:
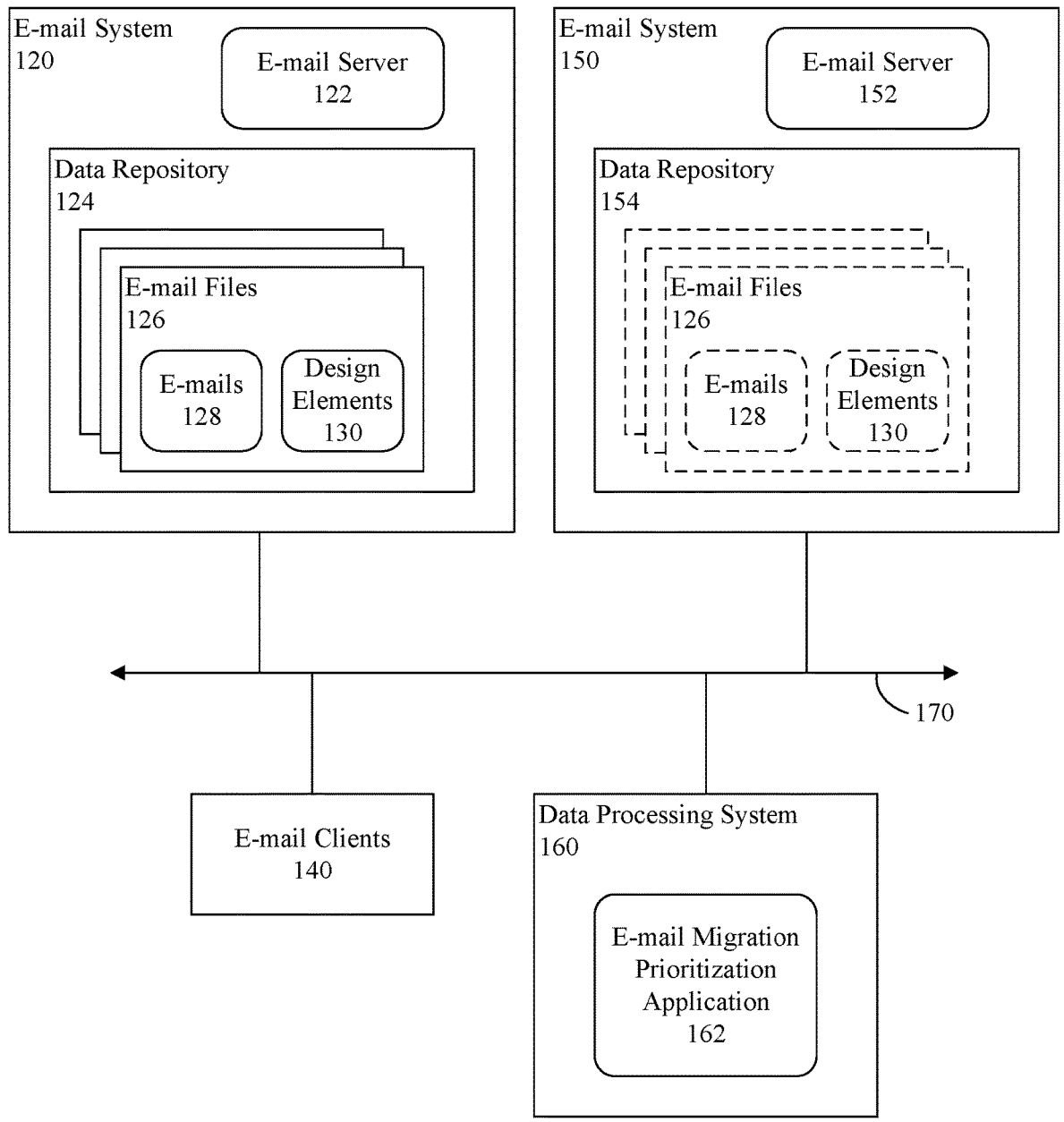
FIG. 1 is a block diagram illustrating an example of a communication system.

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to electronic mail (e-mail) systems, and more specifically, to e-mail file migration. In accordance with the arrangements described herein, when migrating an organization's e-mail files from one e-mail system to another, the e-mail mail files can be analyzed to determine the order in which the files are to be migrated. Specifically, an e-mail migration prioritization application can be configured to scan the e-mail files of individual users, or user groups, and determine, based on certain criteria, which e-mail files require special attention in order to prepare for the migration. For example, e-mail files that contain design elements can be identified. Such design elements may include, but are not limited to, personal agents, personal folders, e-mail rules, custom forms, etc. Based on the criteria, the e-mail migration prioritization application can determine the complexity involved with migrating e-mail files from one e-mail system to another. Based on the identified complexity, the e-mail migration prioritization application can rank such e-mails files. The ranking can indicate a priority of the e-mail files as candidates for migration to the other e-mail system.

Several definitions that apply throughout this document now will be presented.

As defined herein, the term "e-mail" means electronic mail.

As defined herein, the term "e-mail file" means a file containing e-mails and design elements. An e-mail file may contain e-mails and design elements for a particular user, or may contain e-mails and design elements for a group of users.

As defined herein, the term "design element" means an element used by an e-mail system to customize use of the e-mail system for a user or a group of users. Examples of a design element include, but are not limited to, a personal agent, a group agent, a personal folder, a group folder, an e-mail rule, a custom form, a custom macro, custom code developed for processing e-mails, and the like.

As defined herein, the term "template developer" means a person who develops design elements for incorporation into a plurality of e-mail files including e-mail files not assigned to that person. A user who develops a design element for his/her personal e-mail file(s), but is not specifically directed to develop that design element to share with other users is not a "template developer" as described herein unless the design element is specifically designated as being a shared design element.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "output" means storing in memory elements, writing to display, printer or other peripheral output device, sending or transmitting to another system, exporting, or the like.

As defined herein, the term "automatically" means without user intervention.

As defined herein, the term "user" means a person (i.e., a human being).

FIG. 1 is a block diagram illustrating an example of a communication system (hereinafter "system" 100). The system 100 can include an e-mail system 120. The e-mail system 120 can be a processing system (e.g., at least one hardware server), including at least one processor and memory elements, configured to manage e-mail communications. For example, the e-mail system 120 can include an e-mail server application 122. In addition to processing e-mails, the e-mail server application 122 also can include calendaring components, contact management components, task management components, note management components, etc. The e-mail system 120 also can include, or be communicatively linked to, a data repository 124. For example, the data repository 124 can be stored to memory elements (e.g., one or more hard disk drives (HDDs, solid state drives (SSDs) or the like) of the e-mail system 120. In another arrangement, the data repository can be stored in memory elements to which the e-mail system 120 is communicatively linked, for example to memory elements of a network attached storage (NAS), virtual storage, or the like. In one non-limiting arrangement, the e-mail system 120 can be a cloud based system.

Within the data repository 124, the e-mail system 120 can store e-mail files 126 for various users and user groups. In illustration, each user of the e-mail system 120 can have a dedicated e-mail file 126. Each user group also can have a dedicated e-mail file 126. Within each e-mail file 126, e-mails 128 saved for a respective user or user group can be stored. For example, e-mails created by the user, sent by the user and received by the user can be stored in the e-mail file 126 until those e-mails are deleted, if ever. A user's or group's calendar events, contacts, tasks, notes, etc. (not shown) also can be saved in the e-mail file 126. When a user access his/her e-mail account, or a group e-mail account, using an e-mail client 140, the e-mail client 140 can access the user's or group's e-mail file 126 to synchronize e-mails between the e-mail client 140 and the e-mail system 120.

For at least some users/user groups, though not necessarily all users/user groups, design elements 130 can be stored in their respective e-mail files 126. Design elements 130 are elements used by the e-mail system 120 to customize use of the e-mail system for users or user groups. For example, a design element 130 can be a personal agent programmed to implement one or more actions responsive to an e-mail being received. In illustration, an agent can configured to automatically parse data from the e-mail and store the data in a database, or perform any number of other actions. A design element 130 also can be a group agent programmed to implement one or more actions responsive to an e-mail being received by a group e-mail account. Another design element 130 is a folder into which a user moves saved e-mails. A design element 130 also can be an e-mail rule established for a particular e-mail account, a custom form created for a particular e-mail account, a custom macro, custom code for processing e-mails, etc. In this regard, an e-mail file 126 can function, in some respects, as an application.

In some cases, custom e-mail file templates can be created with design elements 130. For example, a template developer can create a custom e-mail file template and apply that e-mail file template to e-mail accounts of multiple users or user groups. For example, when a new e-mail account is created, the e-mail account can be associated with a copy of the e-mail file template assigned to the e-mail account. Accordingly, the design elements 130 in that e-mail file template will be available to the user when the user accesses his/her e-mail account or a group e-mail account. In illustration, the first time the user access his/her e-mail account, his/her e-mail client 140 can synchronize with the e-mail system 120 to receive the design elements 130 in the e-mail client 140. Any new design elements 130 created, or otherwise obtained, by the user and installed in the user's e-mail client 140 also can be synchronized with the e-mail system 120 to store those design elements 130 in the user's e-mail file 126. In this regard, even if a user's e-mail account, or a group e-mail account, was not setup based on an e-mail file template, the user still can create or obtain new design elements 130 in the user's e-mail client, and those design elements 130 also can be synchronized to the user's or group's e-mail file 126.

At some time a system administrator may desire to implement a new e-mail system, such as an e-mail system 150. The e-mail system 150 also can be a processing system (e.g., at least one hardware server), including at least one processor and memory elements, configured to manage e-mail communications. For example, the e-mail system 150 can include an e-mail server application 152. In addition to processing e-mails, the e-mail server application 152 also can include calendaring components, contact management components, task management components, note management components, etc. The e-mail system 150 also can include, or be communicatively linked to, a data repository 154. Again, the data repository 154 can be stored to memory elements of the e-mail system 150 or stored in memory elements to which the e-mail system 150 is communicatively linked, for example to memory elements of a NAS, virtual storage, or the like. In one non-limiting arrangement, the e-mail system 150 can be a cloud based system.

Rather than maintaining the e-mail system 120 in parallel with the e-mail system 150 over an extended period of time, it may be preferable to migrate the e-mail files 126 to the e-mail system 150, more particularly, to the data repository 154. E-mail files that have certain types of design elements 130 can be particularly challenging to migrate successfully. For example, the design elements 130 may be configured to operate with the e-mail system 120, but may not necessarily be configured to operate properly with the e-mail system 150. Thus, if the e-mail files 126 were merely migrated to the data repository 154 without taking additional steps to determine which design elements 130 may not work properly with the e-mail system 150, and taking appropriate measures to re-configure and/or replace those design elements 130, many users may lose critical functionality in their e-mail accounts.

Determining which design elements 130 may not work properly with the e-mail system 150 is not a simple task, and can be very arduous when migrating e-mail files 126 for hundreds or thousands of users. The arrangements described herein provide an automated process for identifying which e-mail files 126 can be migrated without losing functionality of design elements 130, and which e-mail files 126 include design elements 130 that need to be addressed prior to the migration taking place. For example, the design elements 130 may need to be re-configured or replaced with new design elements, or the e-mail system 150 may need to be modified to ensure that the design elements 130 function properly. Moreover, the automated process also can rank the e-mail files 126 according to the complexity of their migration.

In illustration, the system 100 can include a data processing system 160. The data processing system 160 can include at least one processor and memory elements. The data processing system 160 can execute an e-mail migration prioritization application (hereinafter "prioritization application") 162 configured to perform the process of ranking the e-mail files 126. The data processing system 160 can be communicatively linked to the e-mail system 120 via a suitable network 170. In the case that the data repository 124 is external to the e-mail system 120, the data processing system 160 can access the data repository 124 via the network 170, which can, but need not be, the same network the e-mail system 120 uses to access the data repository 124.

The network 170 is the medium used to provide communications links between various devices and data processing systems connected together within the system 100. The network 170 may include connections, such as wire, wireless communication links, or fiber optic cables. The network 170 can be implemented as, or include, any of a variety of different communication technologies such as a WAN, a LAN, a wireless network, a mobile network, a Virtual Private Network (VPN), the Internet, the Public Switched Telephone Network (PSTN), or the like.

A user, for example an administrator coordinating migration of the e-mail files from the data repository 124 to the data repository 154, can configure the prioritization application 162 by specifying various parameters of the e-mail files 126 that are to be ranked. For example, the user can specify various design elements 130 and/or types of design elements 130, and specify a score to be applied by the prioritization application 162 to such design elements 130 and/or types of design elements 130. For instance, a user can specify scores to be applied to personal agents, group agents, personal folders, group folders, e-mail rules, custom forms, custom macros, custom code developed for processing e-mails, and the like. The user also can specify a score to be applied to design elements 130 authored by a template developer, and a different score (e.g., a higher sore) to be applied to design elements 130 not authored by a template developer. In one arrangement, the user also can specify a score to be applied by the prioritization application 162 to e-mail files 126 that are based on an e-mail file template and specify a different score (e.g., a higher score) to e-mail files 126 that are not based on an e-mail file template.

In operation, the prioritization application 162 can access the e-mail files 126 from the data repository 124 and process each of the e-mail files 126 to rank the e-mail files 126 as candidates for migration to the data repository 154 of the e-mail system 150. In illustration, a score can be assigned to each e-mail file 126 based on the number of customizations and the prevalence of certain types of customizations applied to the e-mail file 126, for example as design elements 130. Based on the score assigned to each respective e-mail file 126, the prioritization application 162 can automatically rank each respective e-mail file 126.

Figure 2:
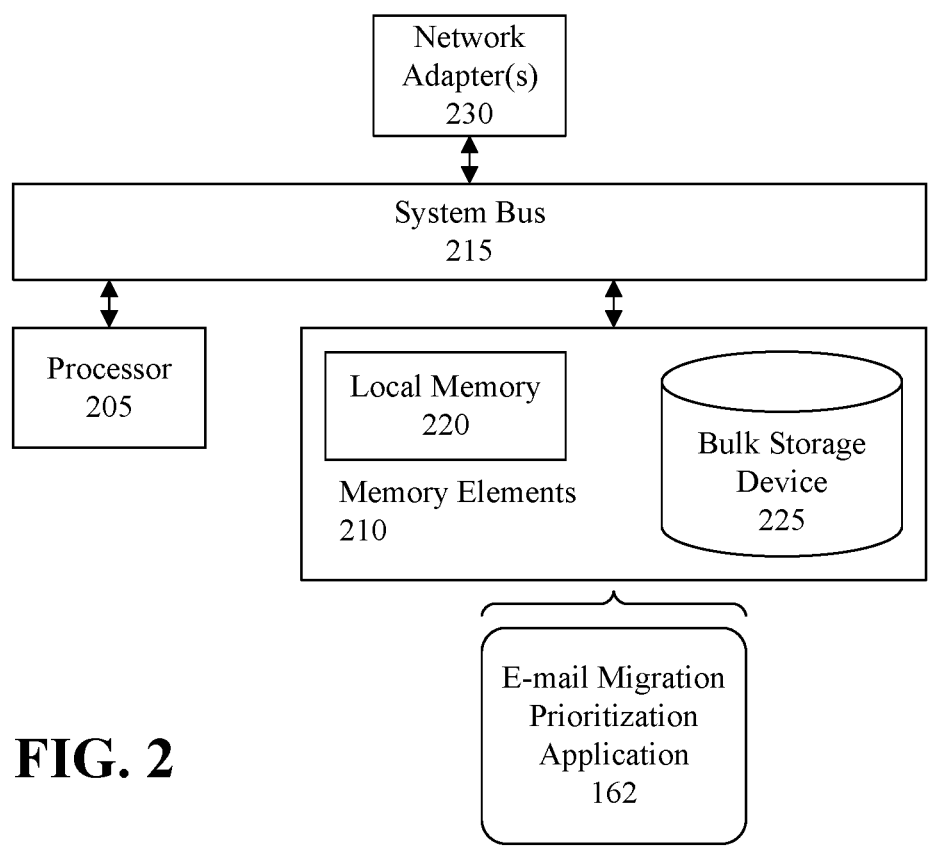
FIG. 2 is a block diagram illustrating example architecture for a data processing system.

FIG. 2 depicts a block diagram of a data processing system 160 configured to rank e-mail files as candidates for migration in accordance with an embodiment disclosed within this specification. The data processing system 160 can include at least one processor 205 (e.g., a central processing unit) coupled to memory elements 210 through a system bus 215 or other suitable circuitry. As such, the data processing system 160 can store program code within the memory elements 210. The processor 205 can execute the program code accessed from the memory elements 210 via the system bus 215. It should be appreciated that the data processing system 160 can be implemented in the form of any system including a processor and memory that is capable of performing the functions and/or operations described within this specification. For example, the data processing system 160 can be implemented as a computer, such as a server, a workstation, a mobile computer, a laptop computer, a tablet computer, and so on.

The memory elements 210 can include one or more physical memory devices such as, for example, local memory 220 and one or more bulk storage devices 225. Local memory 220 refers to random access memory (RAM) or other non-persistent memory device(s) generally used during actual execution of the program code. The bulk storage device(s) 225 can be implemented as a HDD, SSD, or other persistent data storage device. The data processing system 160 also can include one or more cache memories (not shown) that provide temporary storage of at least some program code in order to reduce the number of times program code must be retrieved from the bulk storage device 225 during execution.

Input/output (I/O) devices such as one or more network adapters 230, can be coupled to data processing system 160 to enable the data processing system 160 to become coupled to other systems, computer systems, remote printers, and/or remote storage devices through intervening private or public networks. Modems, cable modems, transceivers, and Ethernet cards are examples of different types of network adapters 230 that can be used with the data processing system 160. Optionally, one or more other I/O devices (not shown), such as a display, a pointing device, a keyboard, a printer, etc. can be coupled to the data processing system 160. The I/O devices can be coupled to the data processing system 160 either directly or through intervening I/O controllers.

As pictured in FIG. 2, the memory elements 210 can store the components of the data processing system 160, namely the prioritization application 162. Being implemented in the form of executable program code, the prioritization application 162 can be executed by the data processing system 160 to perform the ranking processes described herein, and, as such, can be considered part of the data processing system 160. Moreover, the prioritization application 162, and data processed and generated by the prioritization application 162, are functional data structures that impart functionality when employed as part of the data processing system 160.

FIG. 3 depicts an example of scores 305, 310 and a ranking 315 assigned to an e-mail file 136 by the prioritization application 162. The scores 305 can be based on which of the various specified parameters 320 that are met by the e-mail file 126. In illustration, a first parameter can relate to whether an e-mail file template was used to create the e-mail file 126. In this example, an e-mail template was not used, and a corresponding score 305 of "10" can be assigned to the e-mail file 126 for this parameter. If an e-mail template was used, a different score 305 can be assigned (e.g., a lower score, such as "0"). Another parameter can relate to the number of design elements in the e-mail file 126.

Based on the number of design elements, a score 305 can be assigned for that parameter. Such score 305 can directly correspond to the number of design elements, or can be determined by a suitable algorithm based on the number of design elements. A score 305 also can be assigned to each design element based on the design element type and/or the design element is a particular specified design element. A design element type and/or the specific design element can be identified by the prioritization application 162 based on at least one identifier, for example metadata, associated with the design element indicating the design element type and/or the specific design element. In a further arrangement, if the e-mail file 126 contains a large number of a certain type of design element, for example a large number of personal folders or a large number of mail rules, the prioritization application 162 can assign a score to the e-mail file 126 based on such circumstance. A large number can be a number exceeding a threshold value.

Another score 305 can be assigned to each design element based on whether a template, for example a template authored by a template developer, was used to create the design element. In one arrangement, the prioritization application 162 can determine whether a design element is authored by a template developer based on whether the design template is signed by a template developer or includes a template developer signing identifier. For instance, the prioritization application 162 can process metadata associated with the design element to make such determination. If the design element is authored by someone other than a template developer, for example the design element is a custom design element created specifically for a particular user or a particular small group of users, the design element may be signed by someone other than the template developer, for example a user, or include a corresponding signing identifier. Design elements authored by someone other than a template developer, for example a user, can be assigned a higher score than design elements authored by template developers. For example, a design element authored by a user can be assigned a score of "5" and a design element authored by a template developer can be assigned a score of "2."

Based on the scores 305, the prioritization application 162 can derive a total score 310 for the e-mail file 126. In one non-limiting arrangement, the total score 310 can be a sum of the scores 305. In another arrangement, the prioritization application 162 can apply some other algorithm to process the scores 305 to derive the total score 310. Based on the total score 310, the prioritization application 162 can derive a ranking for the e-mail file 126. For example, the prioritization application 162 can apply an algorithm to process the total score 310 to derive the ranking 315. As noted, the ranking 315 can indicate a priority of the e-mail file 126 as a candidate for migration to another data repository 154.

Those e-mail files 126 having the lowest total scores 310 can be assigned the highest rankings 315. Conversely, those e-mail files 126 having the highest total scores 310 can be assigned the lowest rankings 315. By way of example, those e-mail files 126 having a total score 310 of 0-9 can be assigned a ranking of "0," those e-mail files 126 having a total score 310 of 10-19 can be assigned a ranking of "1," those e-mail files 126 having a total score 310 of 20-29 can be assigned a ranking of "2," and so on. In this example, a ranking of "0" is higher than a ranking of "1," a ranking of "1" is higher than a ranking of "2," and so on. Still, any other algorithm can be applied to derive the rankings 315 and the present arrangements are not limited in this regard.

FIG. 4 depicts an example of a list 400 of e-mail files 126 and rankings 315 assigned to the e-mail files 126. The list 400 can be output by the data processing system 160 (e.g., by the prioritization application 162). In one arrangement, the e-mail files 126 can be sorted according to their assigned rankings. For example, highest ranked e-mail files 126 can be presented at the top of the list 400, the next highest ranked e-mail files 126 can be presented next in the list 400, and so on. Accordingly, a user (e.g., an administrator) viewing the list 400 can easily identify groups of e-mail files 126 assigned any particular ranking 315. In one arrangement, rather than outputting a single list 400, the data processing system 160 can output a plurality of lists. For example, a first list can include e-mail files 126 assigned a highest ranking 315, a second list can include e-mail files assigned a next highest ranking 315, and so on.

Based on reviewing the list 400 (or a plurality of lists), the administrator can determine the priority of the different e-mail files 126 as candidates for migration to the other data repository 154. For example, a ranking of "0" assigned to e-mail files 126 may indicate that those e-mail files 126 are ready for migration without further consideration, and thus those e-mail files 126 have highest priority for the migration. The administrator also can evaluate, based on the assigned rankings 315 assigned to other e-mail files 126, an amount of work may be required prior to those e-mail files 126 being migrated. For example, e-mail files 126 assigned a ranking of "1" may require some amount of work to be performed in order to prepare the e-mail files 126 and/or e-mail system 150 for migration of the e-mail files 126. Thus, those e-mail files 126 may have a second level of priority. E-mail files assigned a ranking 315 of "2" may require more work, and thus may have a third level of priority, and so on.

In one arrangement, responsive to generating the list 400, the data processing system 160 can automatically initiate migration to the data repository 154 those e-mail files 126 having a ranking 315 that at least meets a threshold value. For example, the data processing system 160 can automatically initiate migration of those e-mail files 126 having an assigned ranking 315 of "0." In another example, the data processing system 160 can automatically initiate migration of those e-mail files 126 having an assigned ranking 315 of "0" or "1," automatically initiate migration of those e-mail files 126 having an assigned ranking 315 of "0," "1" or "2," or e-mail files 126 having a ranking 315 at least meeting any other specified threshold value. Though some work may be required to make design elements of "1" or "2" ranked e-mail files 126 fully functional, a "1" or "2" ranking may indicate that the work is relatively minor and may be addressed after the migration takes place.

In another arrangement, responsive to generating the list 400, the data processing system 160 can generate a prompt to the administrator. For example, if the administrator is logged into the data processing system 160 via a client device, the data processing system 160 can interface with such client device to present the prompt to the administrator in a user interface. If the administrator is interacting directly with the data processing system 160, the data processing system 160 can present the prompt on a display connected to the data processing system 160. The prompt can be, for example, a user selectable user interface element indicating that at least some of the e-mail files 126 are ready for migration. The administrator can select that user interface element, for example using a mouse, touchpad, touchscreen, or the like, to initiate migration of those e-mail files 126 having a ranking that at least meets a threshold value. For instance, responsive to the user selecting the user interface element, the data processing system 160 can automatically initiate migration of the e-mail files 126 having a ranking of "0," having a ranking of "0" or "1," having a ranking of "0," "1" or "2," or e-mail files 126 having a ranking 315 at least meeting any other specified threshold value.

FIG. 5 is a flow chart illustrating an example of a method 500 of ranking e-mail files as candidates for migration. At step 505, for each of a plurality of e-mail files contained in a first data repository, at least one score for the e-mail file can be determined. Determining the at least one score can comprise determining whether the e-mail file contains at least one design element and, responsive to determining that the e-mail file contains at least one design element, determining whether the design element is authored by a template developer. At step 510, based on scores assigned to the plurality of e-mail files, a ranking can be automatically assigned, using a processor, to each of the plurality of e-mail files. The ranking assigned to each e-mail file can indicate a priority of the e-mail file as a candidate for migration to a second data repository. At step 515, a listing comprising each of the e-mail files, and the ranking assigned to each of e-mail files, can be output.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," or similar language means that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:

for each of a plurality of e-mail files contained in a first data repository, determining at least one score for the e-mail file, determining the at least one score comprising:

determining whether the e-mail file contains at least one design element; and responsive to determining that the e-mail file contains at least one design element, determining whether the design element is authored by a template developer;

based on scores assigned to the plurality of e-mail files, automatically assigning, using a processor, a ranking to each of the plurality of e-mail files, the ranking assigned to each e-mail file indicating a priority of the e-mail file as a candidate for migration to a second data repository;

based on the ranking assigned to each of the plurality of e-mail files, automatically identifying e-mail files having a ranking that at least meets a threshold value;

responsive to automatically identifying e-mail files having the ranking that at least meets the threshold value, presenting to a user a selectable user interface element; and responsive to the user selecting the user interface element, automatically initiating migration of the e-mail files having the ranking that at least meets the threshold value to the second data repository.

2. The method of claim 1, the method further comprising: outputting a listing indicating each of the e-mail files and the ranking assigned to each of e-mail files.

3. The method of claim 1, the method further comprising: outputting a listing indicating only e-mail files assigned a highest ranking.

4. The method of claim 1, the method further comprising:

outputting a first listing indicating only e-mail files assigned a highest ranking; and outputting a second listing indicating only e-mail files having a next highest ranking.

5. The method of claim 1, wherein determining the at least one score comprises determining a type of the design element and determining the score for the e-mail file based, at least in part, on the determined type of the design element.

6. The method of claim 1, wherein determining the at least one score comprises determining whether the design element is a particular specified design element and determining the score for the e-mail file based, at least in part, on whether the design element is the particular specified design element.

7. The method of claim 1, wherein determining the at least one score comprises determining whether the e-mail file contains a number of personal folders or a number of e-mail rules exceeding a threshold value and determining the score for the e-mail file based, at least in part, on whether the e-mail file contains the number of personal folders or the number of e-mail rules exceeding the threshold value.

8. A system, comprising:

a processor programmed to initiate executable operations comprising:

for each of a plurality of e-mail files contained in a first data repository, determining at least one score for the e-mail file, determining the at least one score comprising:

determining whether the e-mail file contains at least one design element; and responsive to determining that the e-mail file contains at least one design element, determining whether the design element is authored by a template developer;

based on scores assigned to the plurality of e-mail files, automatically assigning a ranking to each of the plurality of e-mail files, the ranking assigned to each e-mail file indicating a priority of the e-mail file as a candidate for migration to a second data repository;

based on the ranking assigned to each of the plurality of e-mail files, automatically identifying e-mail files having a ranking that at least meets a threshold value;

responsive to automatically identifying e-mail files having the ranking that at least meets the threshold value, presenting to a user a selectable user interface element; and responsive to the user selecting the user interface element, automatically initiating migration of the e-mail files having the ranking that at least meets the threshold value to the second data repository.

9. The system of claim 8, the executable operations further comprising:

outputting a listing indicating each of the e-mail files and the ranking assigned to each of e-mail files.

10. The system of claim 8, the executable operations further comprising:

outputting a listing indicating only e-mail files assigned a highest ranking.

11. The system of claim 8, the executable operations further comprising:

outputting a first listing indicating only e-mail files assigned a highest ranking; and outputting a second listing indicating only e-mail files having a next highest ranking.

12. The system of claim 8, wherein determining the at least one score comprises determining a type of the design element and determining the score for the e-mail file based, at least in part, on the determined type of the design element.

13. The system of claim 8, wherein determining the at least one score comprises determining whether the design element is a particular specified design element and determining the score for the e-mail file based, at least in part, on whether the design element is the particular specified design element.

14. The system of claim 8, wherein determining the at least one score comprises determining whether the e-mail file contains a number of personal folders or a number of e-mail rules exceeding a threshold value and determining the score for the e-mail file based, at least in part, on whether the e-mail file contains the number of personal folders or the number of e-mail rules exceeding the threshold value.

15. A computer program product comprising a computer readable storage medium having program code stored thereon, the program code executable by a processor to perform a method comprising:

for each of a plurality of e-mail files contained in a first data repository, determining, by the processor, at least one score for the e-mail file, determining the at least one score comprising:

determining whether the e-mail file contains at least one design element; and responsive to determining that the e-mail file contains at least one design element, determining whether the design element is authored by a template developer;

based on scores assigned to the plurality of e-mail files, automatically assigning, by the processor, a ranking to each of the plurality of e-mail files, the ranking assigned to each e-mail file indicating a priority of the e-mail file as a candidate for migration to a second data repository;

based on the ranking assigned to each of the plurality of e-mail files, automatically identifying, by the processor, e-mail files having a ranking that at least meets a threshold value;

responsive to automatically identifying e-mail files having the ranking that at least meets the threshold value, presenting to a user a selectable user interface element; and responsive to the user selecting the user interface element, automatically initiating, by the processor, migration of the e-mail files having the ranking that at least meets the threshold value to the second data repository.

16. The computer program product of claim 15, the method further comprising:

outputting a listing indicating each of the e-mail files and the ranking assigned to each of e-mail files.

17. The computer program product of claim 15, the method further comprising:

outputting a listing indicating only e-mail files assigned a highest ranking.

18. The computer program product of claim 15, wherein determining the at least one score comprises determining a type of the design element and determining the score for the e-mail file based, at least in part, on the determined type of the design element.

19. The computer program product of claim 15, wherein determining the at least one score comprises determining whether the design element is a particular specified design element and determining the score for the e-mail file based, at least in part, on whether the design element is the particular specified design element.

20. The computer program product of claim 15, wherein determining the at least one score comprises determining whether the e-mail file contains a number of personal folders or a number of e-mail rules exceeding a threshold value and determining the score for the e-mail file based, at least in part, on whether the e-mail file contains the number of personal folders or the number of e-mail rules exceeding the threshold value.

* * * * *